United States Patent
Jones et al.

(10) Patent No.: US 12,161,124 B1
(45) Date of Patent: Dec. 10, 2024

(54) ANIMAL ALERT NOZZLE FOR STUNNER

(71) Applicant: Jarvis Products Corporation, Middletown, CT (US)

(72) Inventors: Arthur Jones, Tabor, IA (US); Trent Jones, Tabor, IA (US)

(73) Assignee: Jarvis Products Corporation, Middletown, CT (US)

( * ) Notice: Subject to any disclaimer, the term of this patent is extended or adjusted under 35 U.S.C. 154(b) by 156 days.

(21) Appl. No.: 17/746,405

(22) Filed: May 17, 2022

Related U.S. Application Data

(60) Provisional application No. 63/190,043, filed on May 18, 2021.

(51) Int. Cl.
 *A22B 3/02* (2006.01)
(52) U.S. Cl.
 CPC ...................... *A22B 3/02* (2013.01)
(58) Field of Classification Search
 CPC .................... A22B 3/00; A22B 3/02
 USPC ...................................... 452/57, 62
 See application file for complete search history.

(56) References Cited

U.S. PATENT DOCUMENTS

| | | | |
|---|---|---|---|
| 3,782,018 A * | 1/1974 | Hancox | B25C 1/186 89/33.03 |
| 4,219,905 A * | 9/1980 | Thacker | A22B 3/02 452/62 |
| 4,280,248 A * | 7/1981 | Herubel | A22B 3/02 124/75 |
| 4,503,585 A * | 3/1985 | Hamel | A22B 3/02 452/62 |
| 4,575,900 A * | 3/1986 | Hamel | A22B 3/02 452/62 |
| 4,757,627 A * | 7/1988 | Saligari | A22B 3/02 42/36 |
| 5,692,951 A * | 12/1997 | Huff | A22B 3/02 452/62 |
| 6,135,871 A * | 10/2000 | Jones | A22B 3/02 452/62 |
| 9,681,673 B1 * | 6/2017 | Bock | A22B 3/02 |
| 9,750,263 B1 | 9/2017 | Jones et al. | |
| 10,258,051 B2 | 4/2019 | Jones et al. | |
| 2004/0209562 A1 | 10/2004 | Jones | |
| 2010/0089327 A1 * | 4/2010 | Gross | A01K 5/0114 119/51.01 |

* cited by examiner

*Primary Examiner* — David J Parsley
(74) *Attorney, Agent, or Firm* — DeLio Peterson & Curcio LLC; Robert Curcio

(57) ABSTRACT

A pneumatic animal stunner, comprising a housing having a stunning rod therein capable of being driven along a longitudinal axis forward to stun an animal and rearward to retract the stunning rod, a handle having a valve trigger to control flow of pressurized fluid to drive forward and retract the stunning rod, an alert nozzle disposed on the housing for releasing a supply of pressurized fluid, an alert passageway running to and connecting with the alert nozzle to supply the alert nozzle with the pressurized fluid, and an alert nozzle actuator for supplying the pressurized fluid to the alert passageway. Upon engagement of the alert nozzle actuator, pressurized fluid traverses through the alert passageway and releases through the alert nozzle.

13 Claims, 17 Drawing Sheets

ANIMAL ALERT NOZZLE FOR STUNNER

BACKGROUND OF THE INVENTION

1. Field of the Invention

This invention relates in general to a pneumatic animal stunner for use in livestock/slaughterhouse operations and more specifically to a nozzle system for alerting the animal prior to stunning.

2. Description of Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

U.S. Pat. Nos. 6,135,871, 9,750,263, 10,258,051, and U.S. Patent Publication No. 2004/0209562, the disclosures of which are hereby incorporated by reference, disclose pneumatic animal stunners that, among other things, include a physical catch for the piston that drives the stunning rod.

Larger production plants typically present animals on a movable conveyor strip, with stunner stations disposed at some point along the conveyor's path. Ideally, an animal is stunned as it moves through the stunner station via the conveyor. This system has presented issues in consistency however, because proper and effective stunning procedures require the animal's head to be accessible by the stunner operator as it moves past them on the conveyor line.

In many instances, an animal may move past the stunner station with its head down, or in an otherwise inaccessible position in relation to the stunner operator. An improper stunning attempt may follow, or the conveyor strip may need to be stopped entirely to grant proper access to the animal's head, resulting in wasted time and accumulating delays in production.

In livestock production and processing plants, it is important to slaughter an animal humanely, so that death occurs as quickly as possible and with certainty. While supplemental stunning blows and/or mechanical means have been employed to ensure that disabling occurs quickly, these methods are time consuming and inefficient, and still extend suffering time to some degree for those animals that are not disabled instantly. Thus, it would be useful to employ an apparatus and method to ensure an instantaneous stun to achieve more humane animal disabling.

Stunners using pressurized fluid have developed leaks in their housing after long use, including air leaks at the hose that the animal may sense before being stunned. Therefore, a need exists for an improved stunner which does not preemptively alert the animal to be stunned prior to the impact of the stunning rod and which causes the animal to raise its head to a position which facilitates proper and humane administration of the stunning blow by the rod to instantly achieve disabling of the animal.

SUMMARY OF THE INVENTION

Bearing in mind the problems and deficiencies of the prior art, it is therefore an object of the present invention to provide an animal alert nozzle that causes the animal to raise its head to a position which facilitates proper and humane administration of a stunning blow.

It is another object of the present invention to provide an animal alert nozzle that increases the efficiency and speed of animal processing procedures.

Still other objects and advantages of the invention will in part be obvious and will in part be apparent from the specification.

The above and other objects, which will be apparent to those skilled in the art, are achieved in the present invention which is directed in one aspect to a pneumatic animal stunner, comprising a housing having a stunning rod therein capable of being driven along a longitudinal axis forward to stun an animal and rearward to retract the stunning rod, a handle having a valve trigger to control flow of pressurized fluid to drive forward and retract the stunning rod, an alert nozzle disposed on the housing for releasing pressurized fluid, an alert passageway running to and connecting with the alert nozzle to supply the alert nozzle with the pressurized fluid, and an alert nozzle actuator for supplying the pressurized fluid to the alert passageway. Upon engagement of the alert nozzle actuator, pressurized fluid may traverse through the alert passageway and release through the alert nozzle. Engagement of the alert nozzle actuator may further emit noise from the alert nozzle. The alert nozzle actuator may be located adjacent the handle. The stunner housing may further include an inner chamber in fluid communication with the alert passageway. The alert nozzle actuator may further comprise an alert nozzle valve for controlling fluid communication between the alert passageway and the inner chamber. The alert passageway may be internally disposed within the housing, or disposed outside of the housing.

In another aspect, the present invention is directed to a method of alerting an animal prior to stunning, comprising presenting a stunner proximate an animal, the stunner comprising a housing having a stunning rod therein capable of being driven along a longitudinal axis forward to stun the animal and rearward to retract the stunning rod, engaging an alert nozzle actuator on the stunner to supply pressurized fluid to an alert passageway running to and connecting with an alert nozzle disposed on the stunner to supply the alert nozzle with the pressurized fluid, supplying the pressurized fluid to the alert nozzle via the alert passageway, ejecting the pressurized fluid from the alert nozzle in a direction towards the animal to be stunned, and alerting the animal to be stunned via the ejected pressurized fluid. Responsive to the ejected pressurized fluid, the animal's head may move to an accessible position. The method may further include the steps of engaging a valve trigger on the stunner to drive the stunning rod forward within the stunner housing, and striking the animal's head with the driving sunning rod while the animal's head is still in the accessible position. The method may further comprise the step of emitting a noise from the alert nozzle upon engagement of the alert nozzle actuator.

Still, another aspect of the present invention is directed to an alert valve body for a pneumatic animal stunner, comprising a housing, an alert nozzle disposed on the housing for releasing pressurized fluid, an alert passageway running to and connecting with the alert nozzle to supply said alert nozzle with the pressurized fluid, and an alert nozzle actuator for supplying the pressurized fluid to the alert passageway. Upon engagement of the alert nozzle actuator pressurized fluid may traverse through the alert passageway and release through the alert nozzle. Optionally, engagement of the alert nozzle actuator may further emit noise from the alert nozzle. Pressurized fluid may be supplied by a fluid supply passageway on the housing. The alert valve body may further comprise an alert nozzle actuator cap having an opening therethrough, the alert nozzle actuator disposed within the actuator cap opening, the alert nozzle actuator may further include ears on an end, said opening may further include a shelf portion extending into a portion of the actuator cap such that the ears and the shelf portion form a detent mechanism to retain the actuator within the alert valve body. The nozzle actuator may be moveable between a first position and a second position, wherein the first position restricts fluid communication between the alert passageway and the fluid supply passageway, and wherein the second position allows fluid communication between the fluid supply passageway and the alert passageway.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF EMBODIMENT(S)

Figure 1:
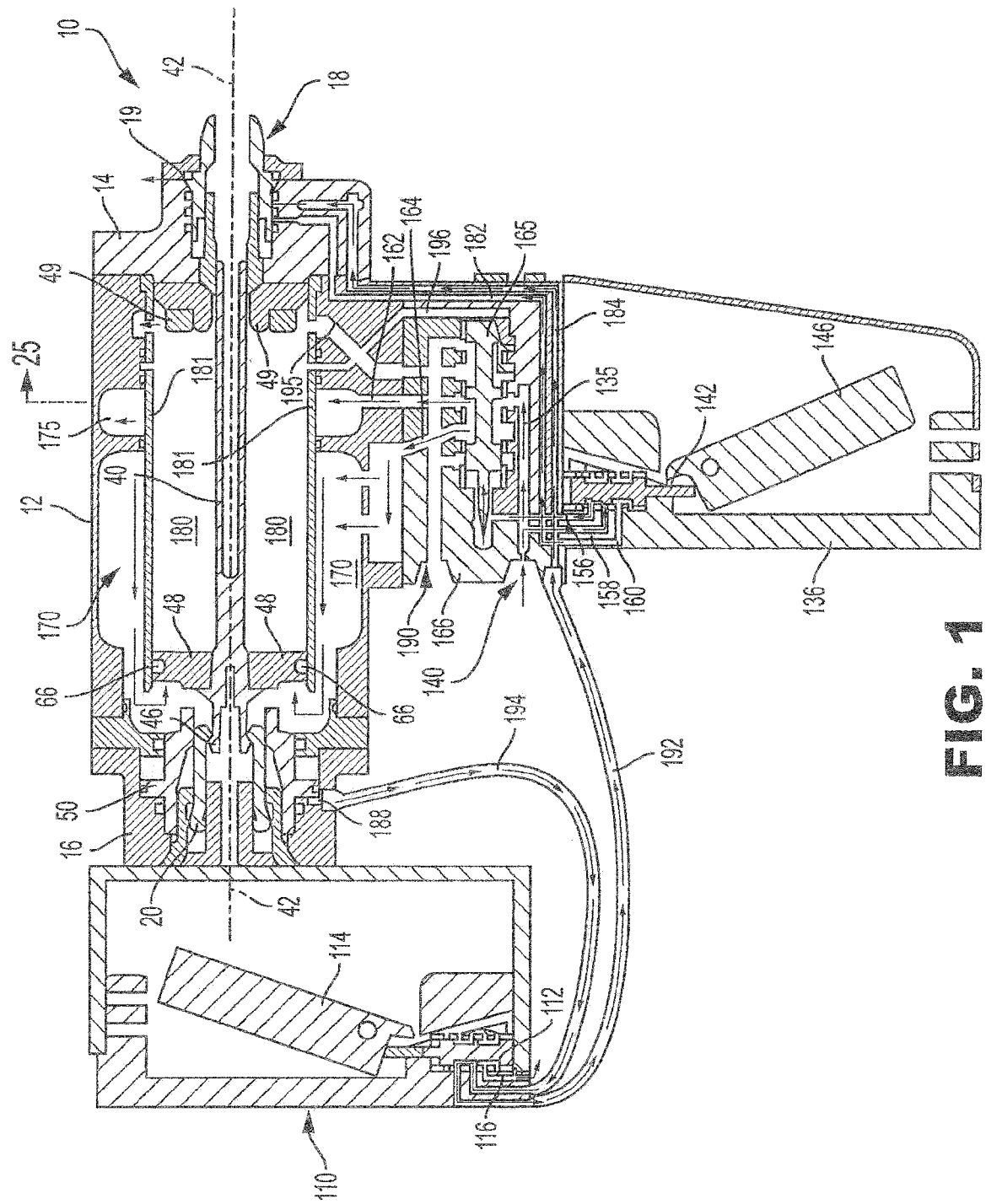
FIG. 1 is a side cross-sectional view of an animal stunner in the catch hold position, with valves in neutral position, with the air supply pressurized and prior to firing, according to the present invention.

In describing the embodiment(s) of the present invention, reference will be made herein to FIGS. 1-26 of the drawings in which like numerals refer to like features of the invention.

Certain terminology is used herein for convenience only and is not to be taken as a limitation of the invention. For example, words such as "upper," "lower," "left," "right," "horizontal," "vertical," "upward," "downward," "inward," "outward," "clockwise," "counterclockwise," "longitudinal," "lateral," "radial," or variants thereof, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

Structure and operation of an exemplary animal stunner 10 according to the present invention is shown in general in FIGS. 1-6. The stunner 10 includes an outer elongated hollow housing 12, an outer housing nose or front end 14, a tail end 16, a stunning rod 40 and a catch 20 for holding and releasing the stunning rod 40. The portion of the animal stunner 10 having a catch is shown in detail in FIGS. 5 and 6. The forward and rearward directions described herein are with respect to the stunner front end 14, and inward and outward directions described herein are with respect to the longitudinal axis 42. A piston 48 surrounded by an O-ring seal 66 slides within an inner cylindrical chamber 180 forward and rearward along axis 42, and carries stunning rod 40. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Stunner 10 may be operated by pressurized fluid, such as compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. Annular cylindrical second pressure or return chamber 175 is also adjacent to, and surrounding inner chamber 180 adjacent its central portion and forward end in the example of FIGS. 1-4. A catch piston chamber 188 is located adjacent and around catch piston 50, which itself holds and releases catch 20. Chambers 170, 175, 180 and 188 may be pressurized to operate the stunner shown, as will be described in more detail below.

A first or main trigger 146 in main handle 136 is used to control a main handle valve 142 to the pressurized fluid, compressed air as used herein, to initiate the sequence that fires the stunning rod. For purposes of safety, to operate the exemplary stunner shown there are two additional conditions that must be met before the catch mechanism for the stunning rod is released. The head contact activator 18 located at the front of the tool must be in contact with the animal to receive the stroke and a second or auxiliary trigger 114 in auxiliary handle 110 must be manually operated. Although it is possible to construct and operate the stunner with only one of these three conditions met, at least two, and preferably all three, should be employed for safety.

FIG. 1 shows the animal stunner 10 in the catch 20 hold position, with valves in the neutral position, and with the air supply pressurized and prior to firing. An air hose (not shown) is attached to the supply port 140 on the main chamber valve body 166, and main valve body 166 is pressurized by the compressed air. Main valve 165 within valve body 166 is positioned to the right by spring (not shown) pressure and pressure force conveyed from air passages 158 (connected to supply port 140) through the main handle valve 142 and then through passageway 156. The main valve spool 165 in this position will simultaneously pressurize, via passageways 135, 162 and 164, the fire chamber 170 and also the smaller return chamber 175, both at a slower fill rate. The stunning rod piston 48 is fully pressurized by air flow from fire chamber 170 behind the piston, and retained from movement by the closed catch 20 assembly holding stunning rod lip 46, as will be explained further below. The main handle valve 142 is in the neutral position and not yet activated by main trigger 146, and valve 142 is extended by spring (not shown) pressure downward, so that the air passage via passageway 184 to the head contact 18 is vented through the main handle valve 142. The head contact 18 is extended by spring (not shown) pressure forward (rightward). Any air pressure on the extend side of the catch piston 50 in chamber 188 is vented via passageways 194 through the auxiliary handle vent 116, and any air pressure in passageway 192 is vented via passageway 184 through the head contact vent 19. The area under and behind the stunning rod piston 48 is vented through the main valve body 166 into the exhaust port 190. The stunner will not fire in this position, wherein main trigger 146, auxiliary trigger 114 and head contact 18 are not depressed.

Figure 2:
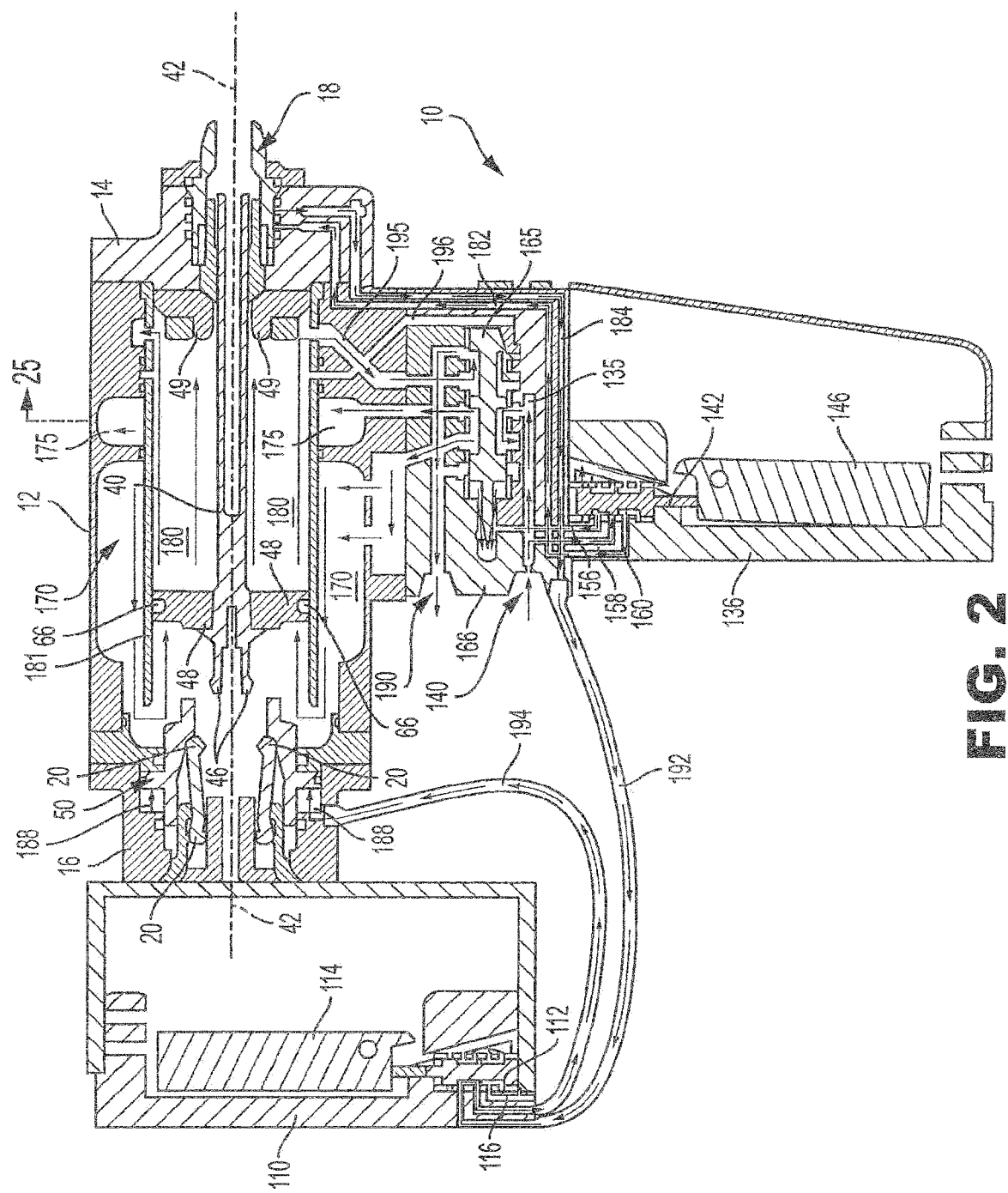
FIG. 2 is a side cross-sectional view of the animal stunner of FIG. 1 in the catch release position, with valves in the firing position, according to the present invention.

FIG. 2 shows the animal stunner in the catch 20 release position, with valves 142, 165, 112 and 18 in the firing position. To commence the firing sequence, the main handle valve 142 is activated by the operator depressing main trigger 146 with one hand, head contact 18 is activated by the operator pressing against the animal's head to move the contact rearward (leftward), and auxiliary handle valve 112 is activated by the operator depressing auxiliary trigger 114 with the other hand. As the main handle valve moves into the upward position, air passage from the main handle valve 142 to main valve spool (spring end) is exhausted via passageway and air passage from the main handle valve 142 to head contact 18 is pressurized via passageway 182. Compressed air also flows via air passage 194 to the catch piston cylinder chamber 188 after flow through the head contact valve 18, passageway 184 and passageway 192 through the auxiliary handle valve 112. As a result of head contact 18 being depressed and auxiliary handle valve 112 being pressurized, catch piston 50 is moved by the compressed air in chamber 188 and extends forward (rightward) to its limit and opens the catches 20. As a result, stunning rod 40 is released and moves forward (rightward) at a high rate of speed, while the air in chamber 180 under and forward of the stunning rod piston 48 is exhausted through passageway 195 and the main valve body 166 exhaust port 190.

Figure 3:
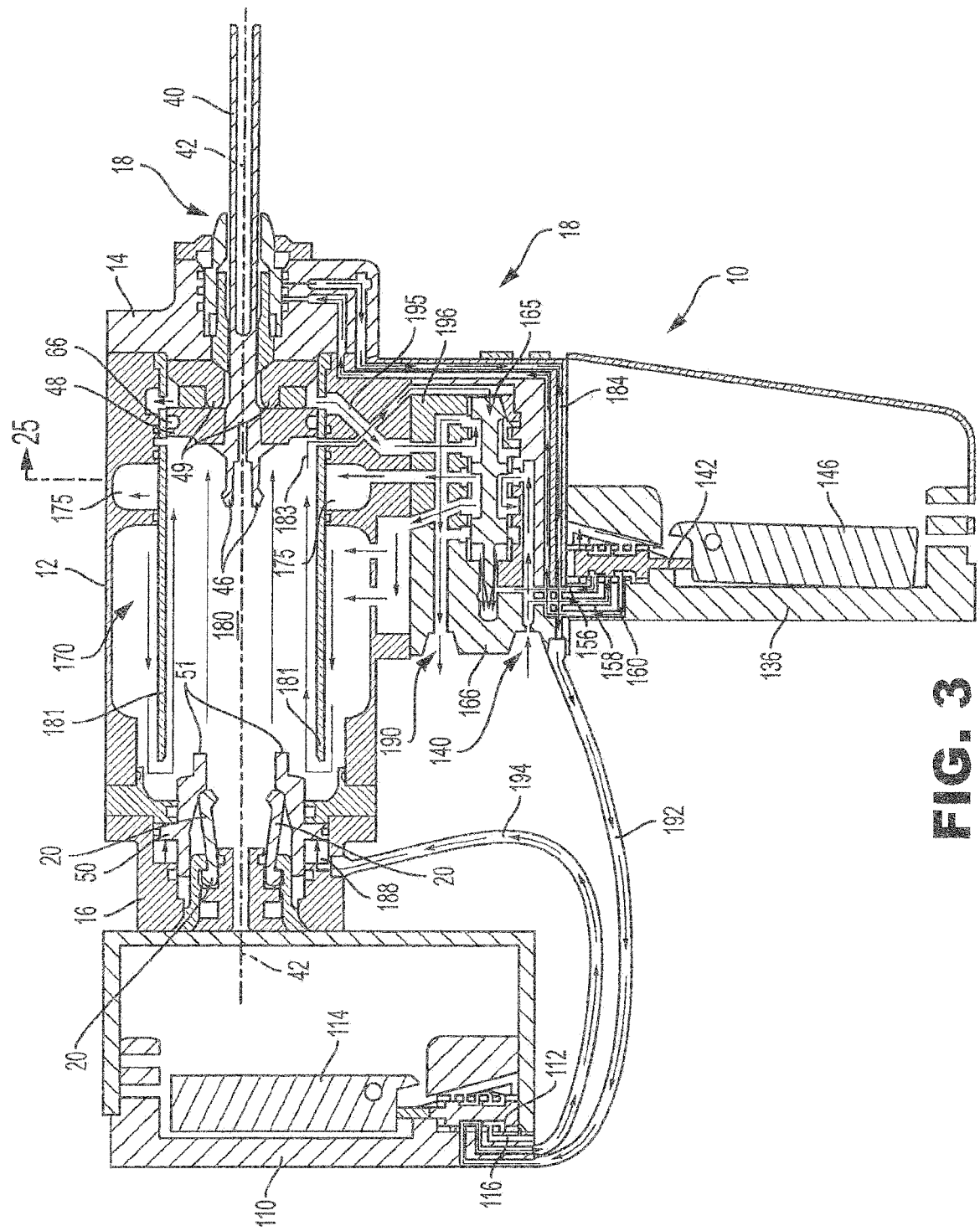
FIG. 3 is a side cross-sectional view of the animal stunner of FIG. 1 with the stunning rod in the end-of-stroke position, according to the present invention.

FIG. 3 shows the animal stunner 10 with the stunning rod 40 in the full forward, end-of-stroke position. The stunning rod stroke is stopped by the annular cushions 49 next to and inside of the nose housing 14. In this position the stunning rod piston seal 66 extends forward and beyond the small holes 183 in the liner 181 of chamber 180 allowing air flow into the main valve reverse passage 196 to the bottom (rightward) end of the main valve spool 165. As main valve 165 is pressurized, the spool commences moving upward (leftward) against the pressure of the spring to reverse the flow of air to the stunning rod piston 48.

Figure 4:
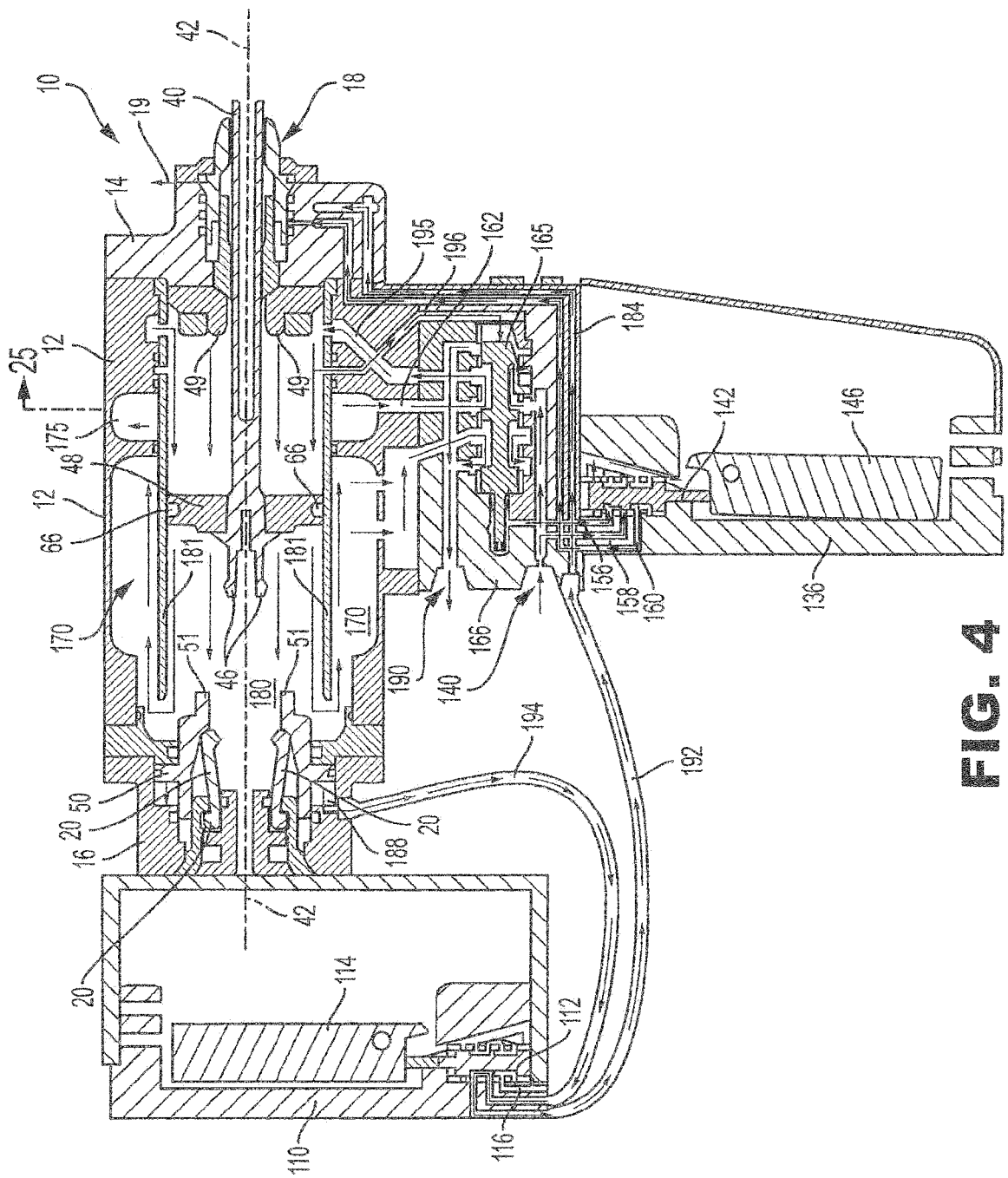
FIG. 4 is a side cross-sectional view of the animal stunner of FIG. 1 with the air in main valve in the reverse position to retract the stunning rod, according to the present invention.
Figure 5:
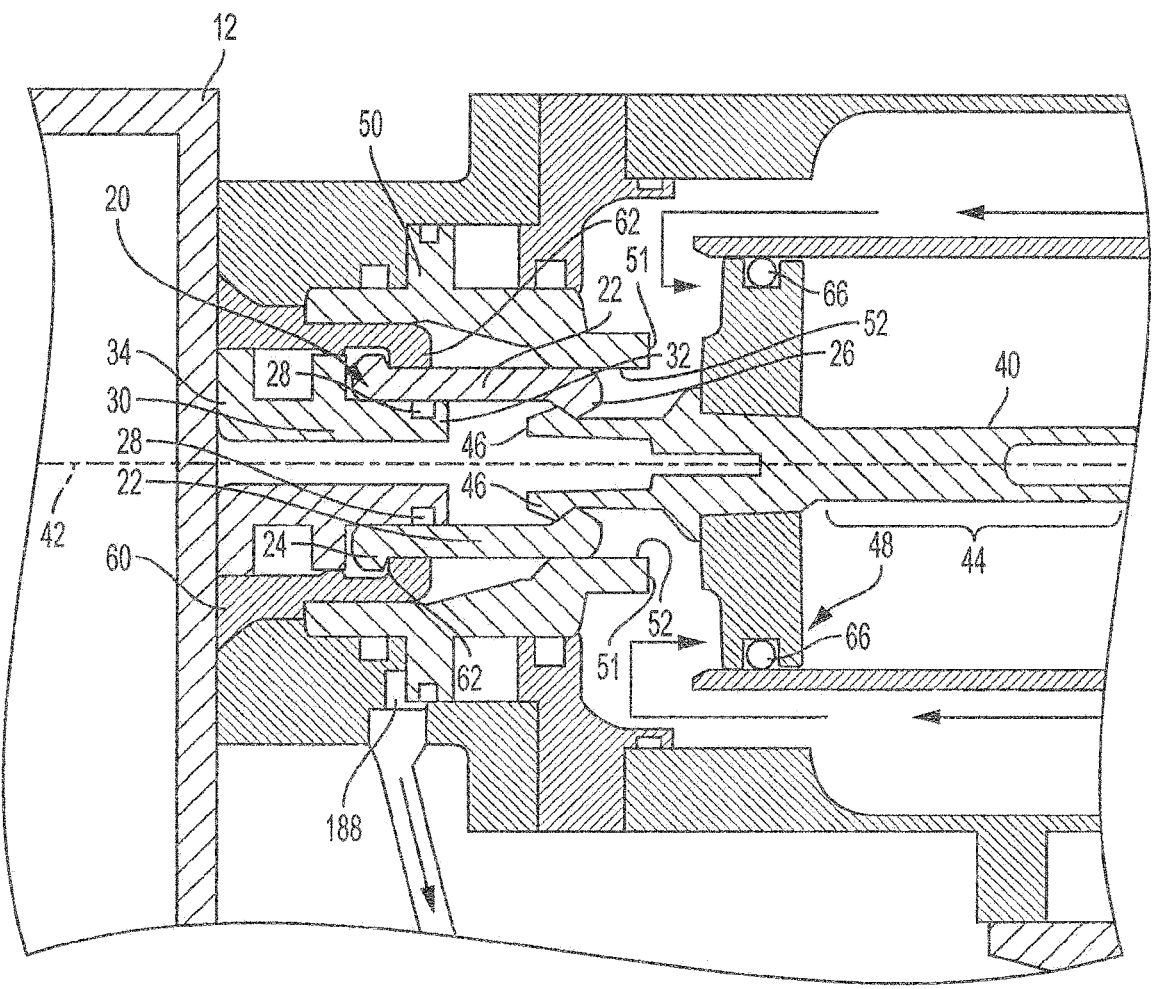
FIG. 5 is an enlarged cross-sectional view of the animal stunner shown in the catch hold position of FIG. 1.
Figure 6:
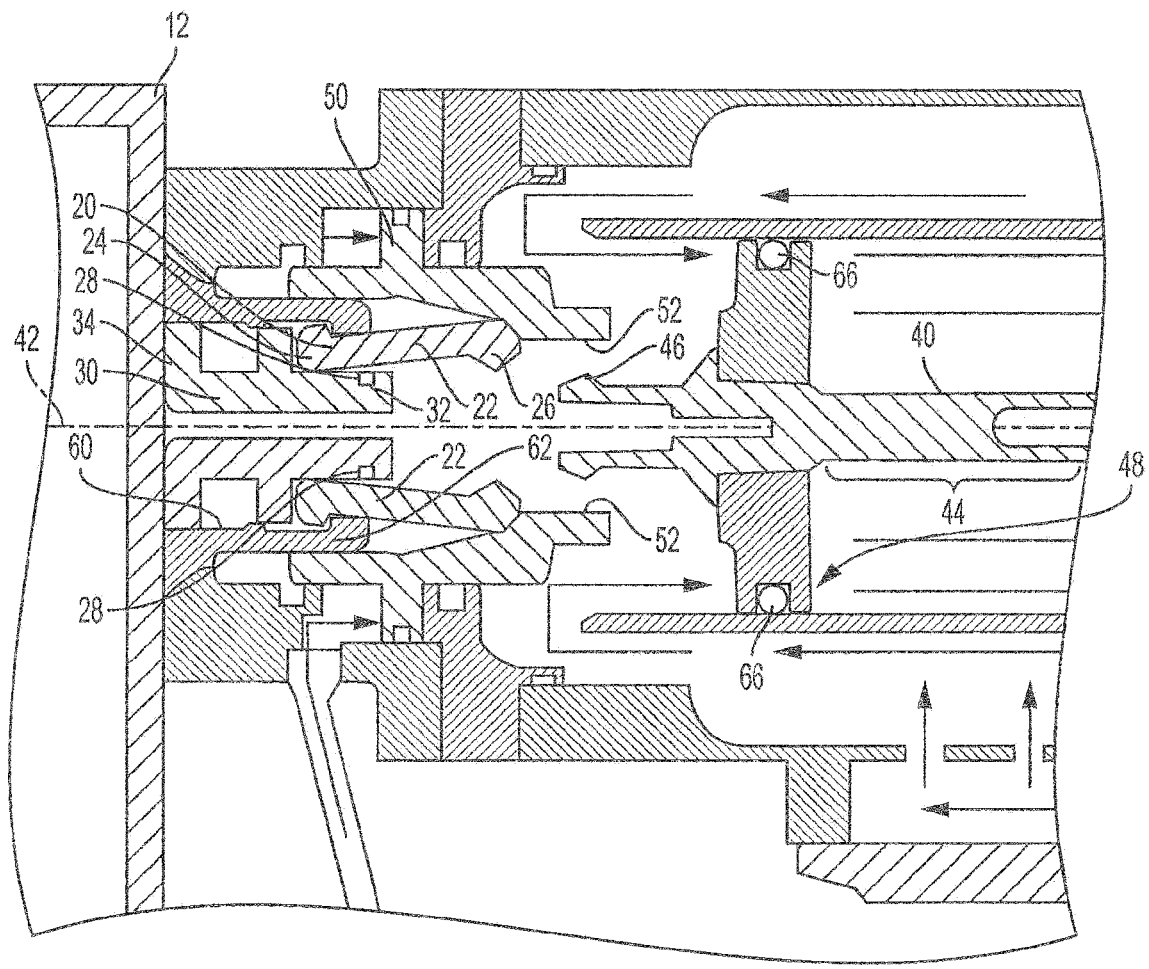
FIG. 6 is an enlarged cross-sectional view of the animal stunner shown in the catch release position of FIG. 2.
Figure 7:
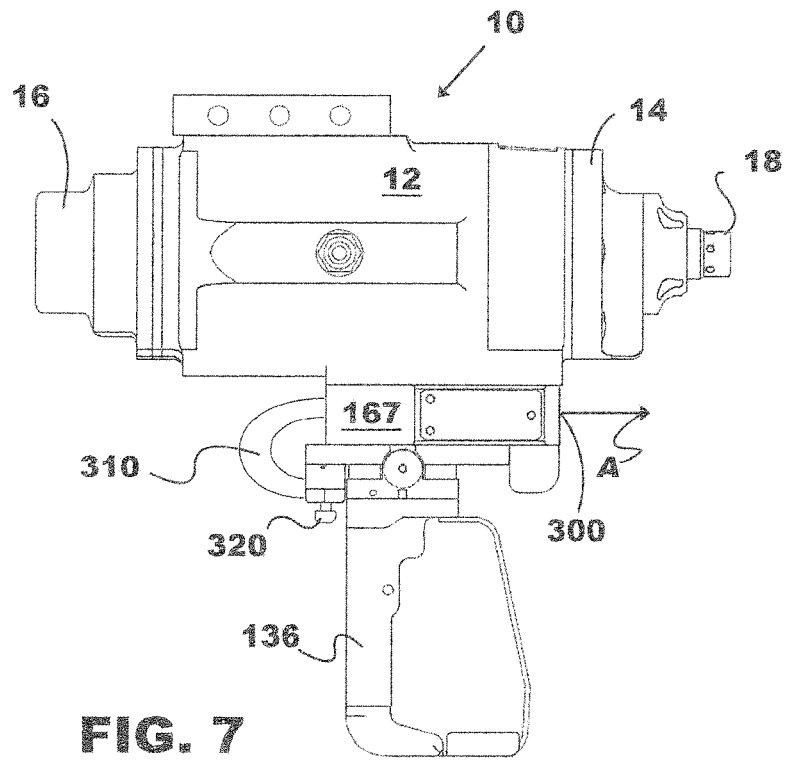
FIG. 7 is a side view of the animal stunner including an embodiment of the animal alert nozzle of the present invention, wherein the hose for supplying the alert nozzle with pneumatic fluid is disposed outside of the animal stunner, and further showing the direction a stream of pressurized fluid would be released from the animal alert nozzle.
Figure 8:
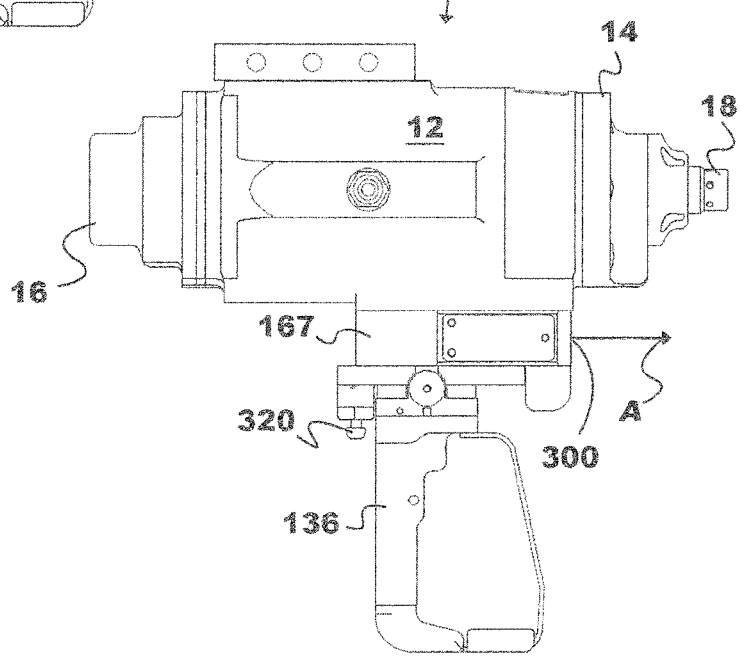
FIG. 8 is a side view of the animal stunner including an embodiment of the animal alert nozzle of the present invention, wherein the passageway for supplying the alert nozzle with pneumatic fluid are disposed within the animal stunner, and further showing the direction a stream of pressurized fluid would be released from the animal alert nozzle.
Figure 9:
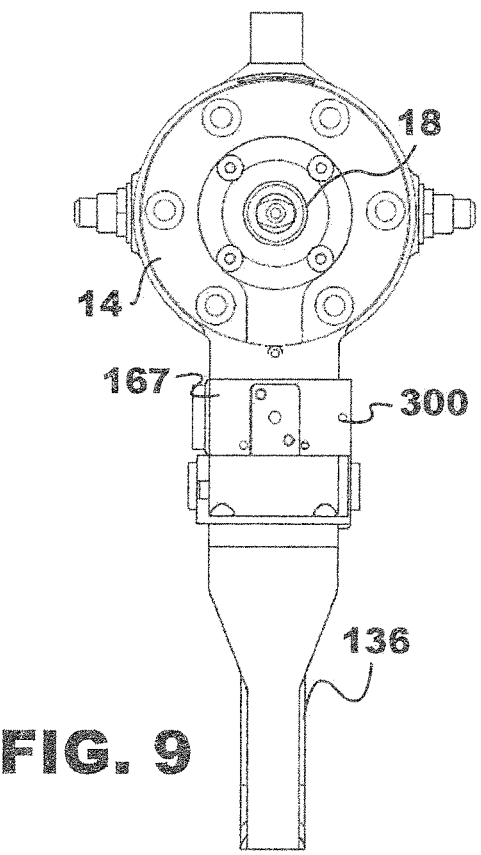
FIG. 9 is a front view of the animal stunner and animal alert nozzle of FIG. 8.
Figure 10:
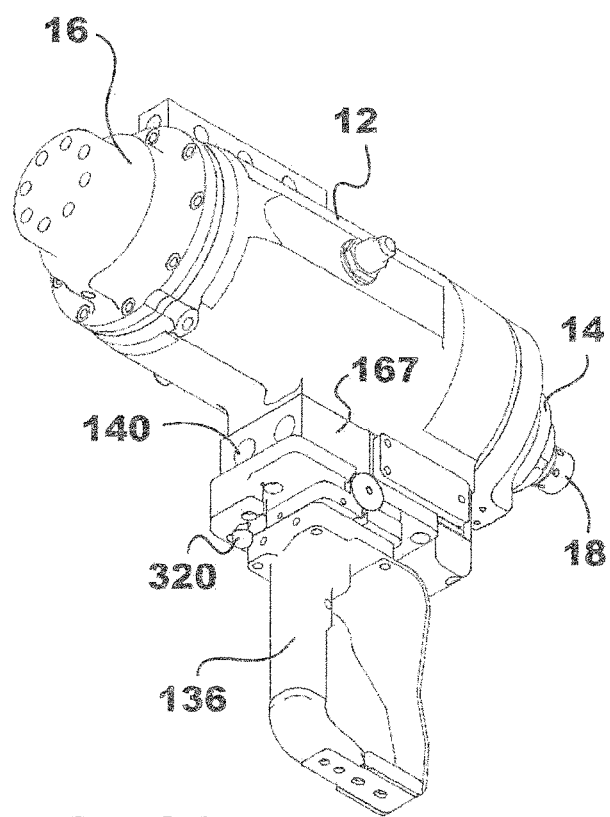
FIG. 10 is a back perspective view of the animal stunner and animal alert nozzle of FIG. 8.
Figure 11:
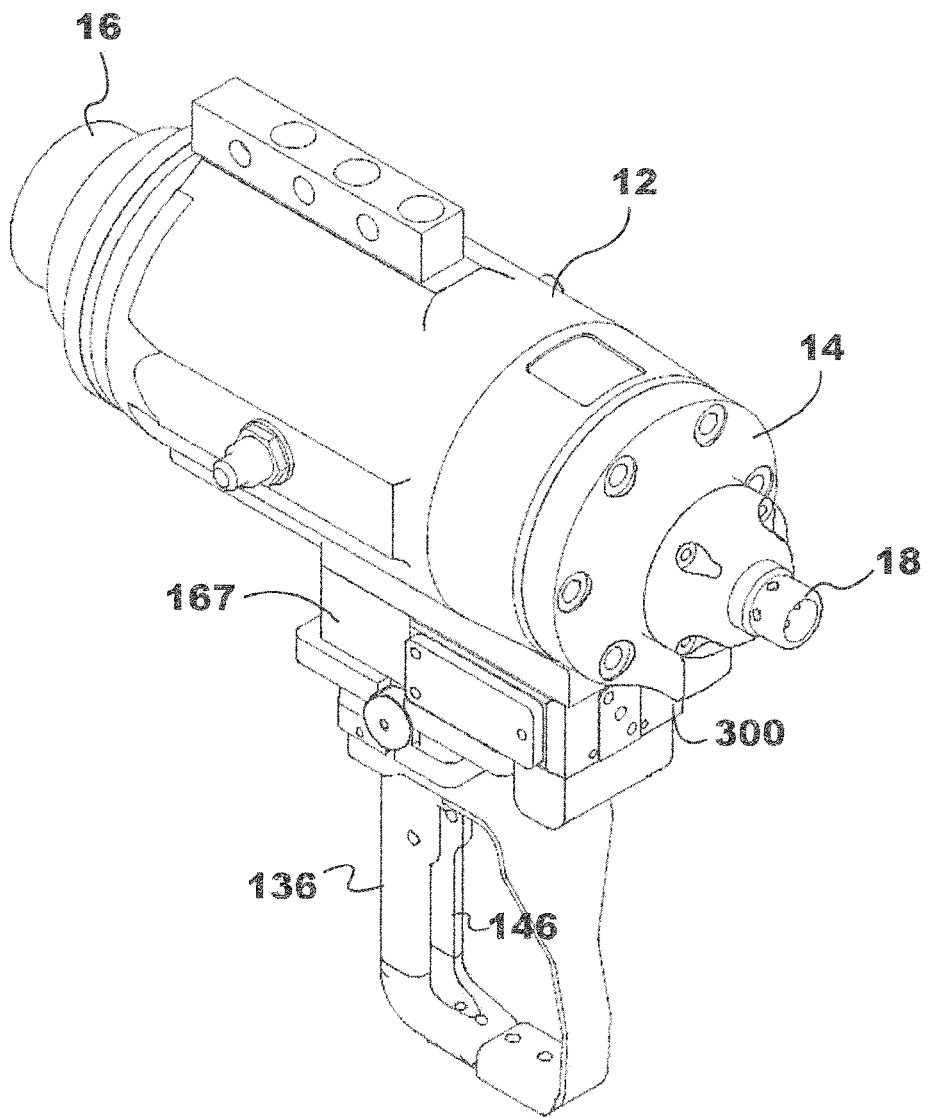
FIG. 11 is a front perspective view of the animal stunner and animal alert nozzle of FIG. 8.

FIG. 4 shows the animal stunner near the end of the firing sequence with the air in main valve 165 moved into the reverse position to retract the stunning rod, as a result of compressed air flow from reverse passage 196 (FIG. 3). Both main handle valve 142 and auxiliary handle valve 112 are still depressed and activated, but head contact 18 is released from the animal's head so that contact valve 18 returns to the forward (rightward) position. Main valve 165 reverse passage 196 is pressurized forcing the main valve spool to move upward (leftward) against the pressure of the spring, so that the main valve body air flow is reversed. As this occurs, fire air chamber 170 is exhausted through the main valve body 166 into the exhaust port 190, and air flow is reversed via passage 194 from the catch piston 50 chamber 188 through open auxiliary handle valve 112, passageways 192 and 184 and out through the head contact 18 vents 19 when the head contact 18 is released. The compressed air pressure immediately available from the return chamber 175 causes pressurized air to move freely and quickly flow via passageways 162 (FIG. 4), main valve 165 and passageway 195 into the forward (rightward) end of chamber 180 (FIG. 6). Although return chamber 175 is volumetrically smaller and contains less pressurized fluid than fire chamber 170, it is sized to provide sufficient air to drive piston 48 and stunning rod 40 rearward. This use of compressed air from adjacent return chamber 175 reduces the volume of air needed as compared to prior art methods where the air to return the piston is supplied via internal passageways from the supply port. Instead of relying on a short, higher-pressure blast of compressed air through the supply port at the same time the piston return cycle is initiated, the present invention pre-supplies the compressed piston return air at the same time the fire chamber is pressurized, during the longer time available between operation cycles. This permits restriction orifices of desired sizes to be used at the supply port 140, thereby saving on total air volume usage by the stunner.

The pressurized air in chamber 180 forward end retracts the stunning rod 40 rearward (leftward) as shown in FIG. 6 until piston 48 contacts the forward end 51 of catch piston 50. As a result of the piston striking it, the catch piston 50 is retracted rearward (leftward) into the catch cylinder 188, which closes the catches 20 by forcing them inward to capture stunning rod lip 46, so that the stunning rod 40 is retained by the catches, as shown in FIG. 1.

When the main handle valve 142 is returned to neutral as a result of main trigger 146 being released and in the undepressed position (FIG. 1), air passage to main valve spool (spring end) is again pressurized, and shifts valve 165 to its original position. Both fire chamber 170 and return chamber 175 are again pressurized, air passage to the nose is exhausted via vent 19, auxiliary handle valve 112 returned to neutral as a result of auxiliary trigger 114 being released, any pressure is vented through vent 116 of the auxiliary handle valve 112, so that air passage to the catch piston 50 is vented two ways for safety, and will not fire again until the firing sequence is again started. The order of firing sequence makes no effect on the performance, and both triggers 146, 114 and the head contact 18 must be activated in any order before firing will occur in this embodiment.

The catch piston 50 is disposed adjacent the catch end portion 26 on a catch side away from the longitudinal axis. The catch piston 50 is in sliding contact with the catch 20 adjacent the catch end portion 26 and out of contact with the catch body portion 22. The catch piston 50 is adapted to slide in the directions of the longitudinal axis 42 between a first, rearward position, shown in FIG. 1, urging the catch end portion 26 toward the stunning rod lip 46 longitudinal axis 42 in the hold position, thereby holding and preventing the stunning rod 40 from being driven forward, and a second, forward position, shown in FIG. 4, permitting the catch end portion 26 to move to the release position away from the stunning rod lip 46 longitudinal axis 42, releasing and permitting the stunning rod 40 to be driven forward.

Turning now to FIGS. 7-24, alert valve body 167 utilizing one embodiment of an alert nozzle 300 according to the present invention is shown. Valve body 167 is secured to the housing 12 on valve body upper portion 167*a* and secured to main handle 136 at the opposing side thereof via the main handle mount portion 350. Valve mount portion 332 is disposed between main handle mount 350 and valve body 167 to secure the main handle mount to the valve body and includes the alert nozzle actuator assembly (as discussed below). Once incorporated within the stunner 10, fluid communication between the internal passages of the main handle 16, housing 12, valve body 167, alert nozzle 300, and the handle 136 is achieved. The end of valve body 167 facing the front end 14 includes within it an opening or nozzle 300 to provide a stream of pneumatic fluid that will blow out from the nozzle in a direction past the front of the housing 12, as indicated by the arrows A in FIGS. 7-8 and 17. Alert nozzle directs pneumatic fluid in a direction that may be parallel to the housing axis 42, as shown herein. It should be understood by those skilled in the art that the present invention is not limited to a fluid stream in a direction parallel to the housing axis and that in other embodiments, other desired angles with respect to the housing axis may be utilized, per design requirements. The alert nozzle may be mounted above, below, or to either side of the housing 12. In some embodiments, alert nozzle 300 may be incorporated within the nose 14 such that it is adjacent head contact 18. While the alert nozzle 300 depicted on valve body 167 includes only a single hole or nozzle, any number of alert nozzles may be incorporated to provide a blast of pneumatic fluid past the front of the housing 12. In some embodiments, the alert nozzle 300 may provide a blast of pneumatic fluid which exits the stunner around head contact 18.

Figure 23:
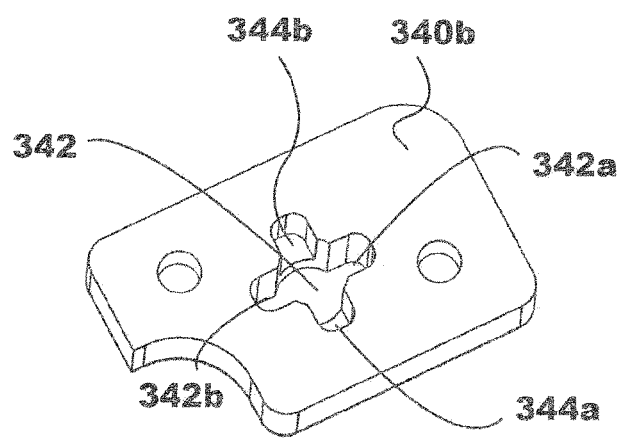
FIG. 23 is a back perspective view of the alert nozzle actuator cap of FIG. 22, with the alert nozzle actuator removed.
Figure 24:
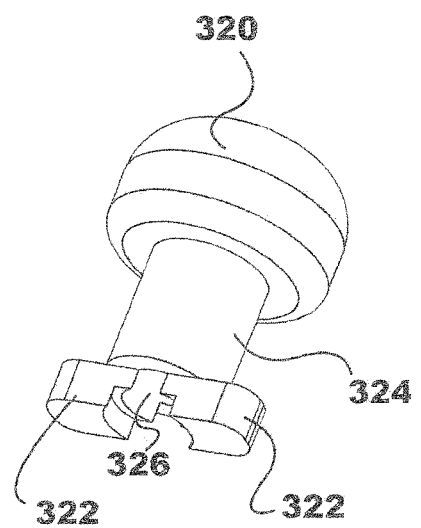
FIG. 24 is a perspective view of the alert nozzle actuator of the actuator assembly of FIG. 20.

At the tail end 16 of the stunner, supply port 140 is disposed on the main chamber of alert valve body 167, which provides pressurized fluid to the stunner 10. Valve mount portion 332 disposed on valve body 167 includes actuator projection 331 which receives the alert nozzle actuator assembly, which comprises alert nozzle actuator 320, alert nozzle valve 330 and actuator cap 340. Actuator assembly is located at the tail end of the valve body 167, such that the alert nozzle actuator is located at the rearward end of handle 136. As shown in the exploded valve body of FIGS. 18 and 19, the nozzle valve 330 is received within the actuator port 308, and includes a stem portion 330*a* which is received within channel 326 of the nozzle actuator 320 (FIG. 24). Nozzle valve 330 is normally biased to prevent fluid within port 308 by spring (not shown) pressure and urges the actuator 320 away from valve body 167. To retain the actuator and nozzle valve 330 within port 308, actuator cap 340 is secured to the actuator projection 331. As shown in FIGS. 20-24, actuator cap 340 includes slotted groove 342 which allows placement of the actuator 320 therethrough via tabbed ends or ears 322 located on the actuator stem 324 opposite the actuator 320. Actuator cap bottom surface 340*b* includes therein a shelf portion 344*a*, 344*b* extending into a portion of the cap 340, creating a surface to retain actuator tabbed ends 322. As depicted in FIG. 23, actuator tabbed ends 322 may be received within the cap 340 along front face 340*a* and into port 308, through slot ends 342*a*, 342*b*, and then rotated such that tabbed ends 322 are now aligned with shelf portion 344*a*,344*b* of the groove 342 (FIG. 22), forming a detent mechanism.

Figure 12:
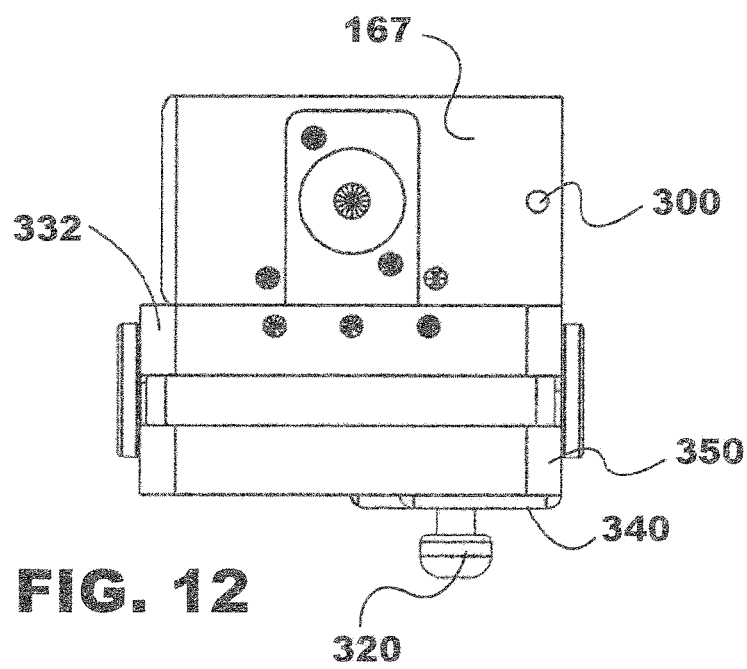
FIG. 12 is a front elevational view of an animal alert nozzle valve body according to an embodiment of the present invention.
Figure 13:
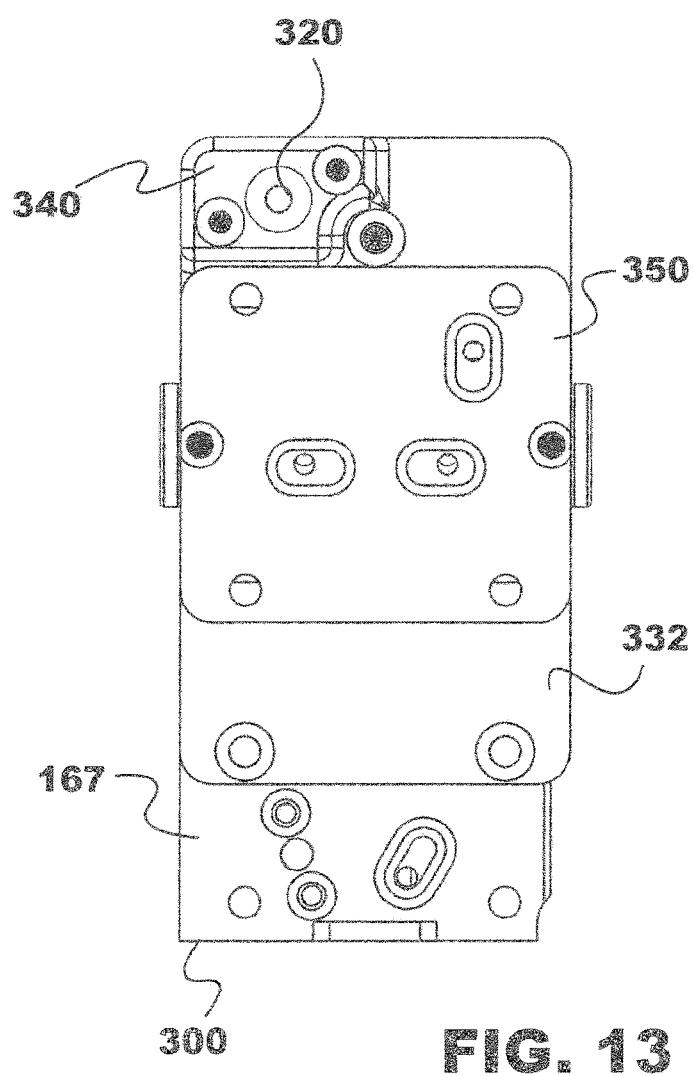
FIG. 13 bottom plan view of the animal alert nozzle valve body of FIG. 12.
Figure 14:
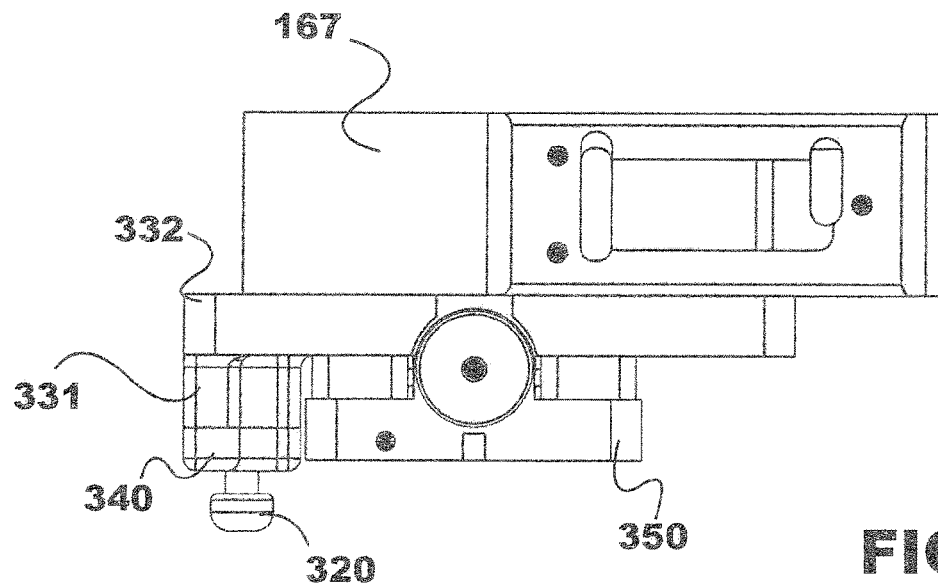
FIG. 14 is side elevational view of the animal alert nozzle valve body of FIG. 12.
Figure 15:
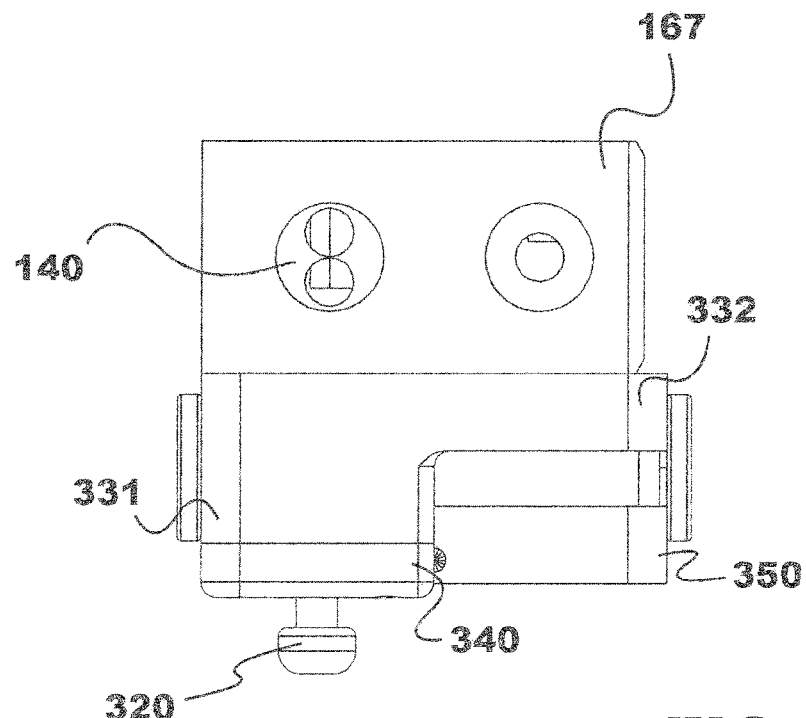
FIG. 15 is a rear elevational view of the animal alert nozzle valve body of FIG. 12.
Figure 16:
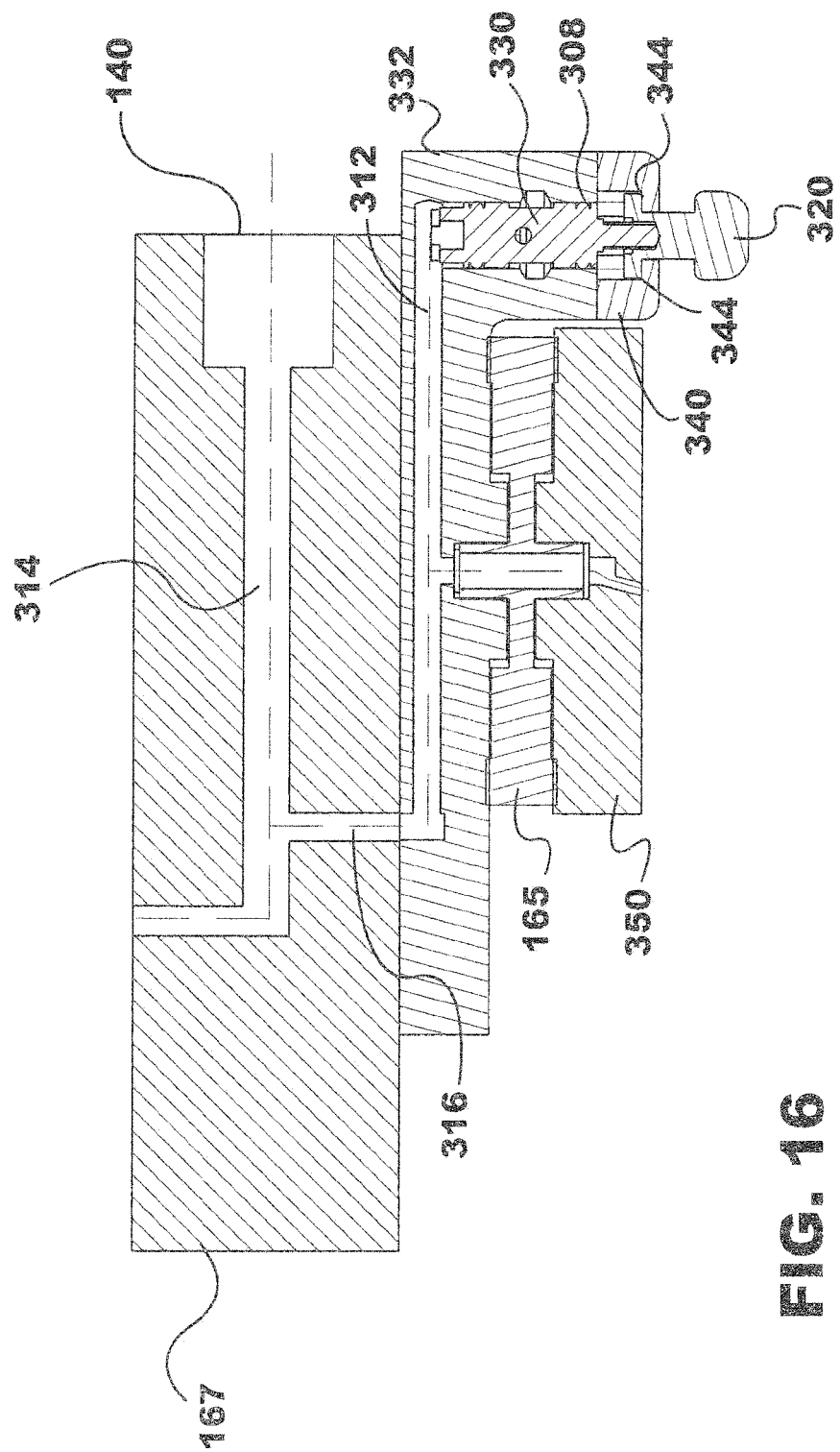
FIG. 16 is a cross-sectional view of the animal alert nozzle valve body of FIG. 12, showing the fluid intake passageways of the valve body which provide pneumatic fluid to the animal alert nozzle.
Figure 17:
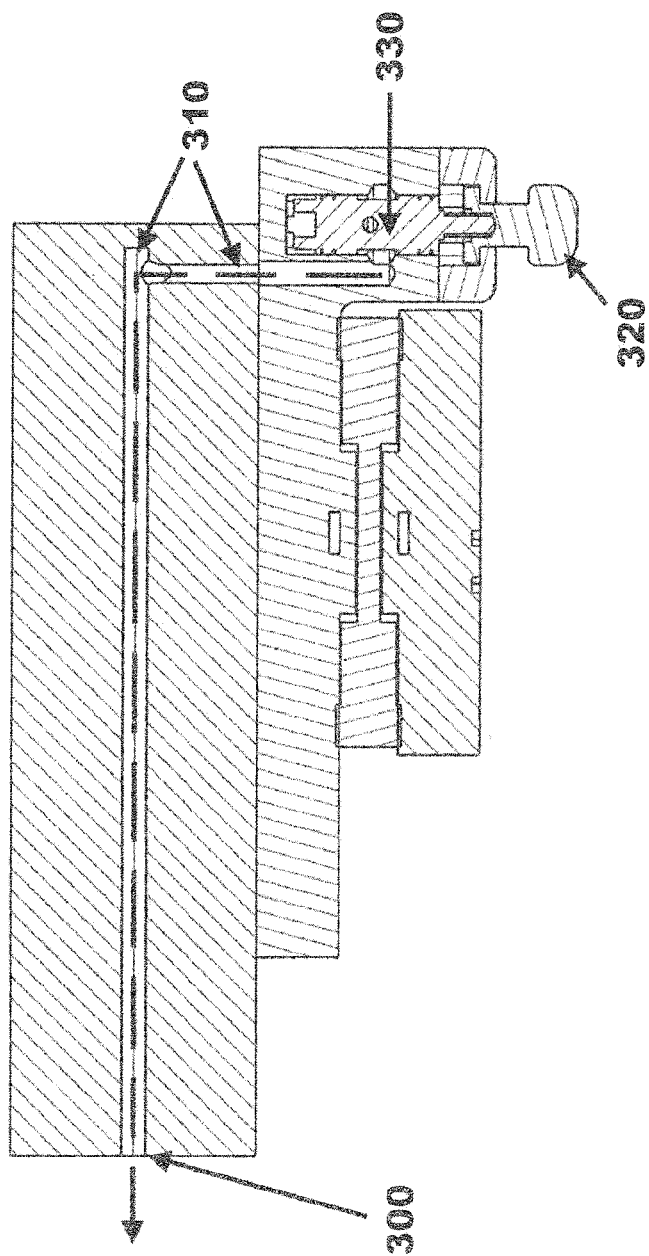
FIG. 17 is another cross-sectional view of the animal alert nozzle of FIG. 12, showing the passageways in which pressurized fluid traverses through the internal passageway and exiting out the alert nozzle valve body.
Figure 18:
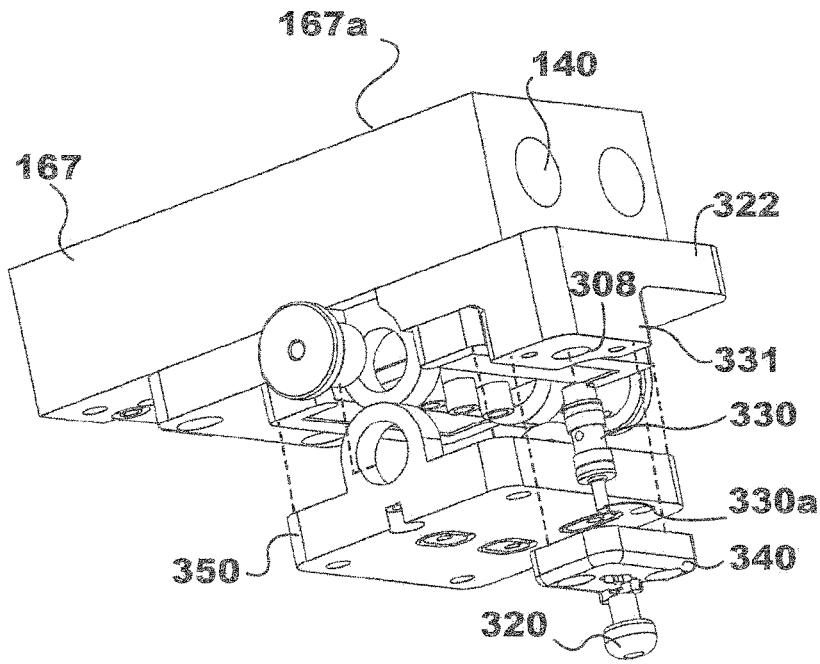
FIG. 18 is an exploded perspective view of the animal alert nozzle valve body of FIG. 12.
Figure 19:
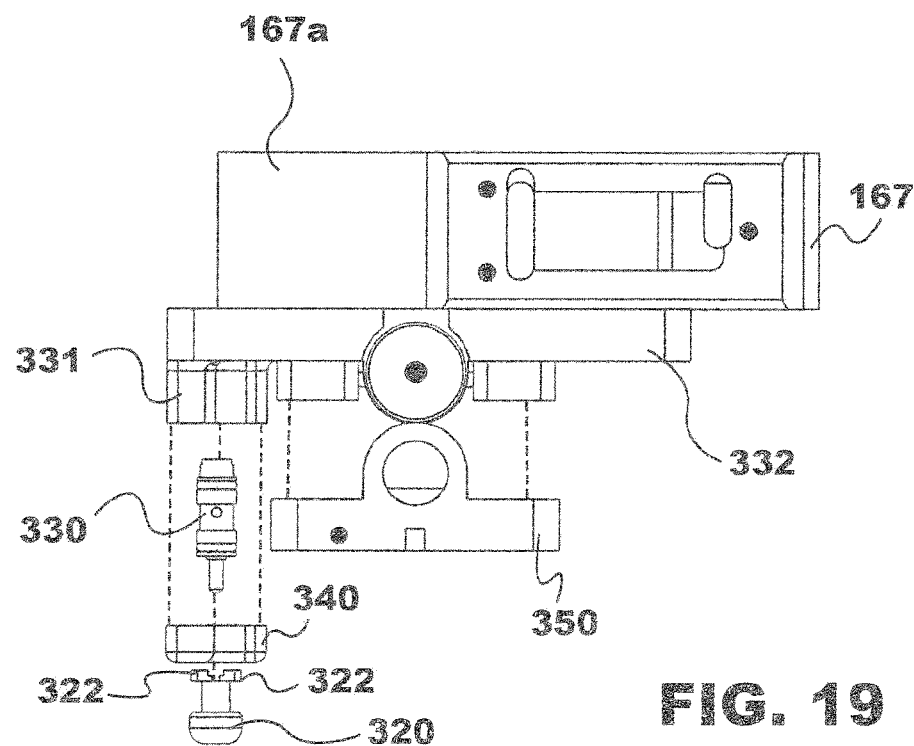
FIG. 19 is an exploded side elevational view of the animal alert nozzle valve body of FIG. 12.
Figure 21:
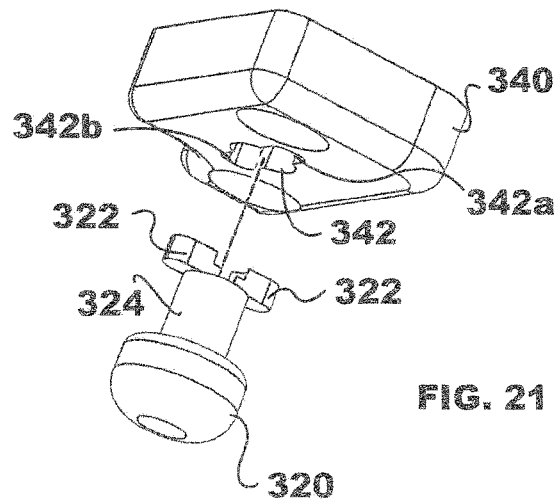
FIG. 21 is an exploded view of the actuator assembly of the animal alert nozzle valve body of FIG. 12.
Figure 20:
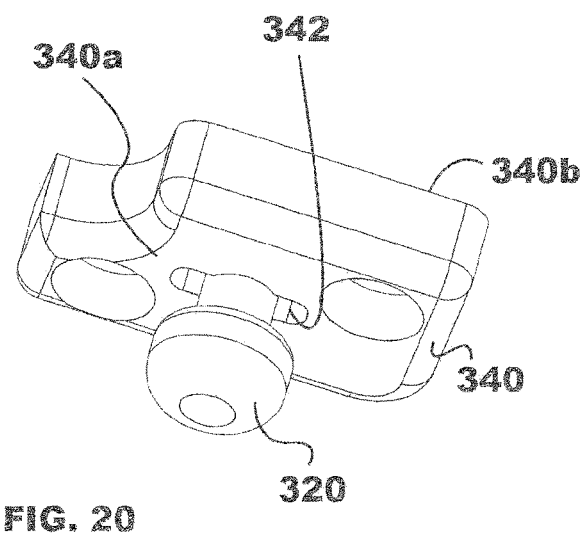
FIG. 20 is a perspective view of the actuator assembly of the animal alert nozzle valve body of FIG. 12.
Figure 22:
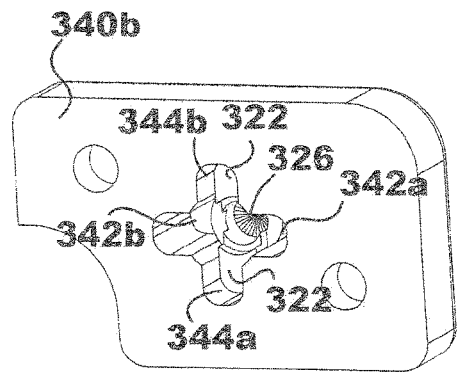
FIG. 22 is a back perspective view of the detent mechanism formed between the alert nozzle actuator and actuator cap of the actuator assembly of FIG. 12.

Exemplary internal, pneumatic passageways of the alert valve body are depicted in FIG. 16 and FIG. 17. As depicted in FIG. 16, supply port 140 supplies pressurized fluid to valve body 167 and the stunner housing 12 via passageway 314, and valve mount portion 332 via 316. Passageway 312 on the valve mount portion 332 supplies fluid to main valve 142 (to supply the passageways of handle 136) and to alert nozzle port 308. Upon depression of the actuator 320, alert valve 330 allows for fluid communication between the supply passage 312 and passageway 310, which extends to and connects with alert nozzle 300. Pressurized fluid may then egress the alert nozzle 300, to the outside of the stunner housing 12. While the opening of alert nozzle 300 in FIG. 12 depicts a rounded opening, other configurations are not precluded. In some embodiments, the alert nozzle 300 may of a fluted shape so as to produce a whistle or other similar sound as pressurized fluid exits alert nozzle 300. After release of the actuator 320, spring pressure will return the alert valve 330 into the closed position. Thus, if an operator continues to hold the actuator, supply passage 312 and passageway 310 remain in fluid communication and pressurized fluid may continue to egress the alert nozzle 300. In some embodiments, the actuator may include a lock to maintain depression of the actuator. While the alert nozzle described herein utilizes internal passageways of the valve body to supply pneumatic fluid to the stunner alert nozzle, other passageways and modalities of providing pneumatic fluid to the stunner are not meant to be precluded. Furthermore, while the actuator described herein is operated by way of depression, in some embodiments the actuator may be operated by a slide or rotational movement. In one embodiment, like that depicted at FIG. 7, the supply of fluid may be external (i.e., running from a fluid supply through hose or passageway 310' outside of the housing 12 to an external nozzle 300). In some embodiments, a pressurized supply may be supplied to the alert nozzle 300 which is separate from the supply port 140. Still other embodiments may utilize the internal chambers of the stunner housing 12 to pressurize the alert nozzle 300, including return chamber 175, for example, which may pre-supply the alert nozzle 300 at the same time the fire chamber is pressurized.

Due to its placement at the rearward end of the handle 136, an operator may actuate the alert nozzle with a single finger (preferably their thumb) while still maintaining hand placement on the stunner 10. Thus, not only does the alert nozzle of the present invention allow the operator to quickly draw the attention of the animal along the processing line, but the operator may also do so without need to move their hand from the line. While the placement of actuator 320 in the exemplary diagrams depicts the stunner 10 on handle 136, other placements are not precluded. In some embodiments, nozzle actuator may be placed on auxiliary handle 110, adjacent auxiliary handle 114, or any other location on the stunner housing 12.

Alert nozzle 300 is further optionally capable of producing sound when alert nozzle actuator 320 is engaged, either naturally via the escape of pressurized fluid from the nozzle 300, or through other sound-producing means. In some embodiments, nozzle 300 may include a cap adhered to a portion of the nozzle to produce a high frequency pitch or whistle as pneumatic fluid egresses nozzle 300. The combination of escaping pressurized fluid contacting the animal and/or noise being emitted from the nozzle will thus bring attention of the animal to the operator, and more importantly, cause the animal head to raise as a result of the captivating effects of the alert nozzle. If the animal head was in a position which was inaccessible to the operator, the alert nozzle will redirect the attention of the animal to the operator, providing a clearer and more easily accessible point of contact between the animal's head and the stunner. Thus, a more efficient stun will result, decreasing the processing time since the alert nozzle may quickly redirect the position of the animal head, thereby reducing the need to stop the conveyor strip to stun animals that were initially inaccessible due to the positioning of their heads.

The alert valve body 167 incorporating the alert nozzle may be integral with the stunner 10 described above, or of a separate construction which may replace the valve body of an existing stunner. An exemplary view of the alert valve body is depicted in FIGS. 12-19. As shown in the exploded views of FIGS. 18 and 19, valve body 167 may be secured to the housing 12 about its upper end 167a for connection with the stunner housing 12 for fluid communication between the internal chambers of the stunner and valve body 167. Once secured to the housing, the valve body is secured to the main handle 136 via main handle mount portion 350. After the valve body 167 is secured between the stunner housing 12 and the handle 136, fluid communication throughout the stunner is achieved, allowing the main valve 165 to operate as described above, and depicted in FIG. 16.

Figure 25:
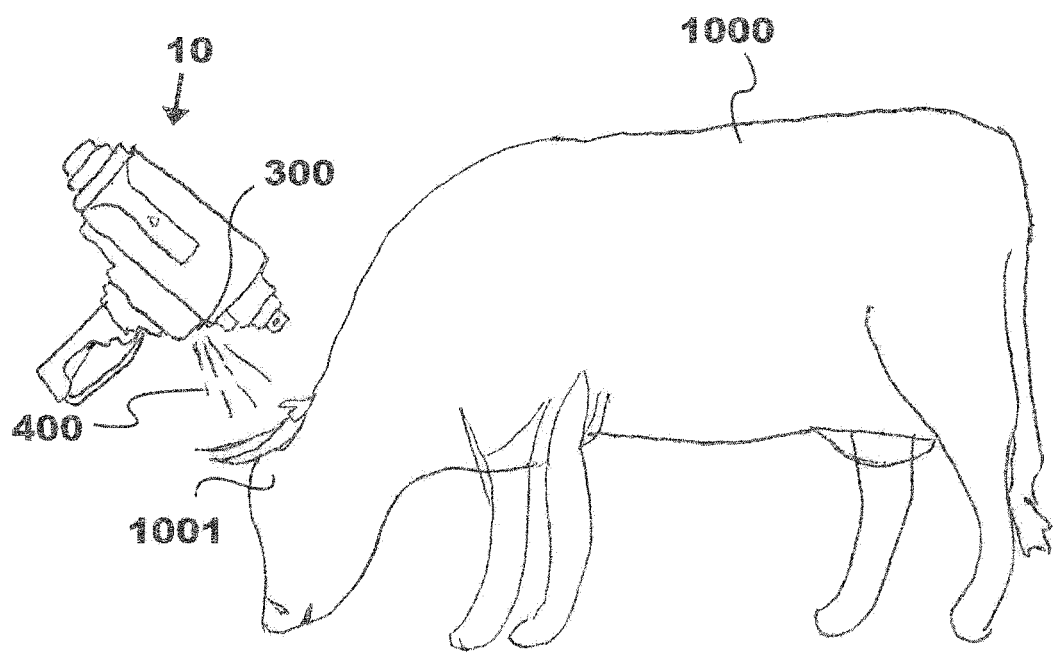
FIG. 25 is an illustrative view of a method of using the animal alert nozzle according to embodiments of the present invention, wherein the animal alert nozzle is utilized while the animal head is in an inaccessible position.
Figure 26:
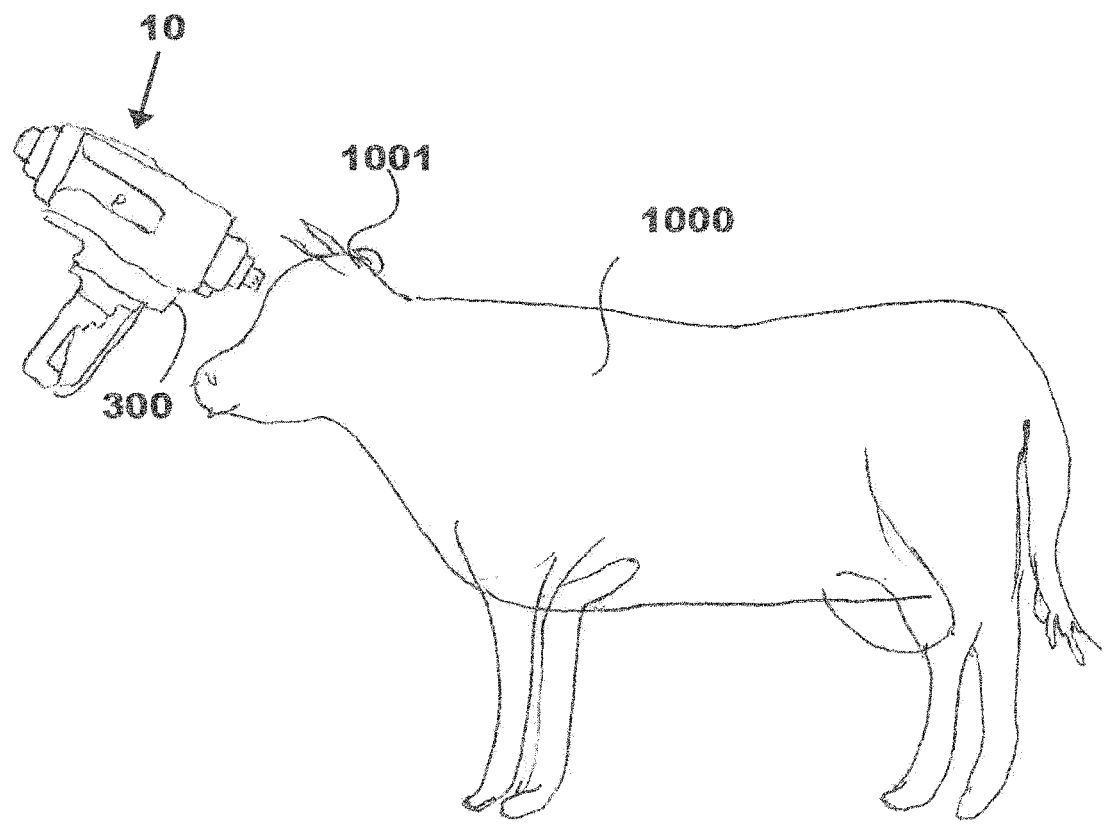
FIG. 26 is an illustrative view of the method of FIG. 25, after the animal alert nozzle is used and the animal head has moved to an accessible position as a result of alert nozzle.

Turning now to FIGS. 25 and 26, an exemplary method of using the stunner with the animal alert nozzle of the present invention is shown. In use, an operator or end user will present the pneumatic stunner 10 inclusive of the animal alert nozzle of the present invention proximate the animal 1000 to be stunned. The pneumatic stunner 10 has been supplied with a volume of pressurized fluid as described in the embodiments above, and may be supplied prior to presenting the stunner proximate, subsequent to presentation, or during presentation of the stunner proximate the animal. As seen in FIG. 25, the animal head 1001 is lowered, preventing effective placement of the stunner to disable animal 1000. The operator may move the stunner 10 within a distance of the animal 1000, aiming alert nozzle 300 at a location along the animal 1000, preferably the neck or ears. Upon depression of actuator 320, the alert nozzle 300 will release pressurized fluid 400 from the nozzle 300 via the at least one hose or passageway 310 of the alert nozzle 300. Pressurized fluid 400 ejected from the animal alert nozzle 300 travels beyond stunner housing, past the stunner nose 14 and optional head contact 18 in a direction towards the animal to be stunned. As depicted in FIG. 26, the animal 1000 is thus alerted via the ejected pressurized fluid 400, which causes the animal to move its head to an accessible position for the operator to properly stun the animal. The operator may then engage the valve trigger to drive the stunning rod 40 forward within the stunner housing 12, and properly strike the animal's head with the stunning rod while the animal's head is still in the accessible position.

The animal alert nozzle of the present invention is advantageous, allowing an operator to immediately direct the attention of an animal which has the animal head in an inaccessible location. This is of particular advantage in larger production plants utilizing a conveyor path with stunning stations, since an animal with the head in an inaccessible position may be quickly alerted using the alert nozzle of the present invention, preventing improper stunning attempts or the need to stop the convey strip to grant an operator access to the animal head, and ensuring a quick and humane death to the animal.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,

What is claimed is:
1. A pneumatic animal stunner, comprising:
 a housing having a stunning rod disposed in an inner chamber of the housing capable of being driven along a longitudinal axis forward to stun an animal and rearward to retract the stunning rod;
 a supply port on a rearward portion of the housing including a stunner passageway, a supply passage, and a main valve passageway therebetween and connecting the stunner passageway with the supply passageway, said stunner passageway for the supply of pressurized fluid to the inner chamber, said supply passage in communication with an alert nozzle actuator;
 a main valve in communication with the main valve passageway, said main valve operable to control flow of pressurized fluid in the stunner passageway to drive a stunning rod in the inner chamber forward along a longitudinal axis;
 a handle having a valve trigger to control flow of pressurized fluid to the main valve;

an alert nozzle disposed on a forward portion of the housing for releasing pressurized fluid to a forward exterior of the housing;

an alert passageway running to and connecting with the alert nozzle to supply the alert nozzle with the pressurized fluid; and said alert nozzle actuator comprising a valve in fluid communication with the supply passage and the alert passageway, said alert nozzle actuator operable to control flow of pressurized fluid to the alert nozzle;

wherein pressurized fluid will traverse through the alert passageway and release through the alert nozzle only upon depression of the alert nozzle actuator and without causing movement of the stunning rod.

2. The alert nozzle of claim 1 wherein engagement of the alert nozzle actuator further emits noise from the alert nozzle.

3. The alert nozzle of claim 1 wherein the alert nozzle actuator is located adjacent the handle.

4. The alert nozzle of claim 1 wherein the alert passageway is internally disposed within the housing.

5. The alert nozzle of claim 1 wherein the alert passageway is disposed outside of the housing.

6. A method of alerting an animal prior to stunning, comprising:

supplying a stunner with pressurized fluid via a supply port on a rearward portion of the stunner, said supply port having a stunner passageway for supplying pressurized fluid to a main valve passageway and a stunner inner chamber, said supply port having a supply passage for supplying pressurized fluid to an alert nozzle actuator, said supply passage connected to the main valve passageway;

presenting the stunner proximate an animal, the stunner comprising a housing having a stunning rod disposed within the inner chamber capable of being driven along a longitudinal axis forward to stun the animal and rearward to retract the stunning rod, said stunner further including a main valve in communication with the main valve passageway, said main valve operable to control flow of pressurized fluid in the stunner passageway to drive a stunning rod in the inner chamber forward along a longitudinal axis;

engaging, by the operator, the alert nozzle actuator on the stunner to supply pressurized fluid from the supply port to an alert passageway running to and connecting with an alert nozzle disposed on a forward portion of the stunner to supply the alert nozzle with the pressurized fluid;

supplying the pressurized fluid to the alert nozzle via the alert passageway;

ejecting, only upon engagement of the alert nozzle actuator, the pressurized fluid from the alert nozzle to a forward exterior of the stunner in a direction towards the animal to be stunned; and alerting the animal to be stunned via the ejected pressurized fluid without causing movement of the stunning rod.

7. The method of claim 6 wherein responsive to the ejected pressurized fluid the animal moves an animal head to an accessible position.

8. The method of claim 6 further comprising the steps of:

engaging a valve trigger on the stunner to drive the stunning rod forward within the stunner housing; and striking the animal's head with the driving stunning rod while the animal's head is still in the accessible position.

9. The method of claim 6 further including the step of emitting a noise from the alert nozzle upon engagement of the alert nozzle actuator.

10. An alert valve body for a pneumatic animal stunner, comprising:

a housing;

a supply port on a rearward portion of the housing, the supply port including a stunner passageway, a supply passage, and a main valve passageway connected to the stunner passageway and the supply passageway, the stunner passage for the supply of pressurized fluid to a stunner housing inner chamber and a main valve passageway, the supply passage in communication with an alert nozzle actuator and the main valve passageway;

an alert nozzle disposed on a forward portion of the housing for releasing pressurized fluid to a forward exterior of the housing;

a main valve in communication with the main valve passageway, said main valve operable to control flow of pressurized fluid in the stunner passageway to drive a stunning rod in the inner chamber forward along a longitudinal axis;

an alert passageway running to and connecting with the alert nozzle to supply said alert nozzle with the pressurized fluid; and said alert nozzle actuator comprising a valve in fluid communication with the supply passage and the alert passageway, said alert nozzle actuator operable to control flow of pressurized fluid to the alert nozzle;

wherein pressurized fluid to traverse through the alert passageway and release through the alert nozzle only upon depression of the alert nozzle actuator and without causing movement of the stunning rod.

11. The alert valve body of claim 10 wherein engagement of the alert nozzle actuator further emits noise from the alert nozzle.

12. The alert valve body of claim 10 further comprising an alert nozzle actuator cap having an opening therethrough, said alert nozzle actuator disposed within said actuator cap opening, said alert nozzle actuator further including ears on an end, said opening further including a shelf portion extending into a portion of the actuator cap such that said ears and said shelf portion form a detent mechanism to retain said actuator within said alert valve body.

13. The alert nozzle of claim 10 wherein the nozzle actuator is moveable between a first position and a second position, wherein said first position restricts fluid communication between said alert passageway and said supply passage, and wherein said second position allows fluid communication between said supply passage and said alert passageway.

* * * * *